Figure 1:
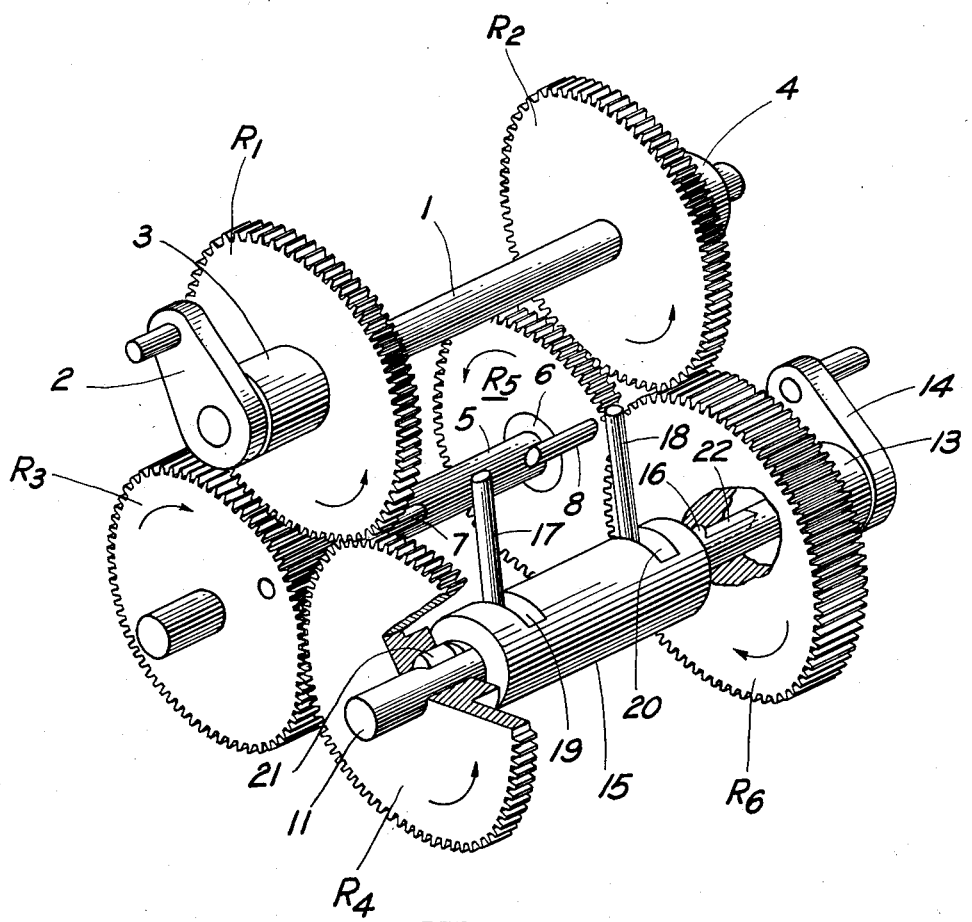

July 17, 1956  G. H. WAARLE ET AL  2,754,690
REVERSING DEVICE

Filed March 20, 1952  2 Sheets-Sheet 1

INVENTORS
GODFRIED HENDRIK WAARLE
WILHELMUS LAMBERTUS VERVEST
BY

AGENT.

July 17, 1956     G. H. WAARLE ET AL     2,754,690
REVERSING DEVICE

Filed March 20, 1952     2 Sheets-Sheet 2

INVENTORS
GODFRIED HENDRIK WAARLE
WILHELMUS LAMBERTUS VERVEST
BY
*Fred M. Vogel*
AGENT.

United States Patent Office 2,754,690
Patented July 17, 1956

2,754,690

REVERSING DEVICE

Godfried Hendrik Waarle and Wilhelmus Lambertus Vervest, Hilversum, Netherlands, assignors to Hartford National Bank and Trust Company, Hartford, Conn., as trustee Application March 20, 1952, Serial No. 277,558

Claims priority, application Netherlands April 14, 1951

6 Claims. (Cl. 74—323)

This invention relates to reversing devices comprising a driving shaft and a driven shaft, the latter of which should be rotatable in two directions where as the direction of rotation of the driving shaft remains unchanged. As a rule, known devices are complicated and expensive. In practice there is a need for a relatively simple and cheap reversing mechanism which, moreover, is required to be compact. In addition the number of revolutions of the driven shaft should easily be variable in either direction. Such a reversing device may, for example, be employed in transmitters or receivers for wireless communication, wherein the adjustment of tuning members is electrically controlled and the transmitter or receiver should permit of being rapidly tuned to different frequencies.

The object of the present invention is to provide a reversing device which may be relatively cheap and simple.

According to the present invention, a reversing device comprises a driving shaft and a driven shaft, in which the former invariably has the same direction of rotation and that of the driven shaft reverses periodically and automatically, an auxiliary shaft being provided which is actuated by the driving shaft and propels the driven shaft for one direction of rotation, whereas for the other direction of rotation the driven shaft is directly actuated by the driving shaft.

The driving shaft, the driven shaft and the auxiliary shaft may be coupled in different manners. It is advantageous, in one embodiment of the invention, to use gear wheels for the couplings, the driven shaft being furnished with two gear wheels, one of which is meshed with a gear wheel rigidly secured to the auxiliary shaft and in turn meshed with a gear wheel rigidly coupled to the driving shaft, and the second gear wheel fitted to the driven shaft and in turn meshed with a gear wheel rotatable about the auxiliary shaft being driven directly by a gear wheel rigidly secured to the driving shaft, provision being made of members and control means automatically and periodically establishing the connection of the two gear wheels to the driven shaft in such manner that if one of the gear wheels is connected to the shaft the second gear wheel is freely rotatable about this shaft and conversely.

The said members providing for the connection of the two gear wheels to the driven shaft preferably consist of two intercoupled tipping keys. A tipping key is easy to manufacture and readily adjustable. The two tipping keys may, for example, be interconnected by means of a spring.

In one embodiment of the invention, the gear wheels fitted to the auxiliary shaft preferably comprise means by which the members establishing the connection of the gear wheels to the driven shaft are clutched or declutched. Thus it is achieved that no members outside the reversing mechanism are required to effect the reversal of the driven shaft and this is effected by means within the reversing mechanism.

In another embodiment of the invention the means referred to consist of two pins each of which co-operates with either of two levers secured to the interconnected tipping keys.

It is particularly advantageous if, in a further embodiment of the invention, the direction of rotation of the pin and that of the lever with which the pin co-operates, are the same, it being thus achieved that the speed at which the lever is operated to cause the tipping keys to shift is a maximum, so that reversal of the movement of the driven shaft is also rapidly effected.

It may sometimes be desirable that reversal of the motion of the driven shaft is only effected after the shaft has performed a given number of revolutions. In other cases the driven shaft is required to reverse its direction prior to completing one revolution. In a further embodiment of the invention, the gear wheels on the auxiliary shaft therefore have a number of teeth different from that of the gear wheels co-operating therewith on the driving shaft and the driven shaft, the gear wheels on the last-mentioned shafts having the same number of teeth. If the gear wheels on the auxiliary shaft have a smaller number of teeth than the other gear wheels, the driven shaft will make more than one revolution before reversing direction. If the number of teeth of the gear wheels of the auxiliary shaft is larger the driven shaft will not have completed one revolution at the instant of changing its direction. If all gear wheels have the same number of teeth the driven shaft reverses direction after each complete revolution.

Furthermore it may be desirable that the number of revolutions of the driven shaft prior to reversing direction should be adjustable.

In order that the invention may be more readily carried into effect, it will now be described in greater detail with reference to the accompanying drawing representing, by way of example, one embodiment thereof, and in which:

Fig. 1 shows in perspective and diagrammatically a reversing mechanism.

Figure 2:
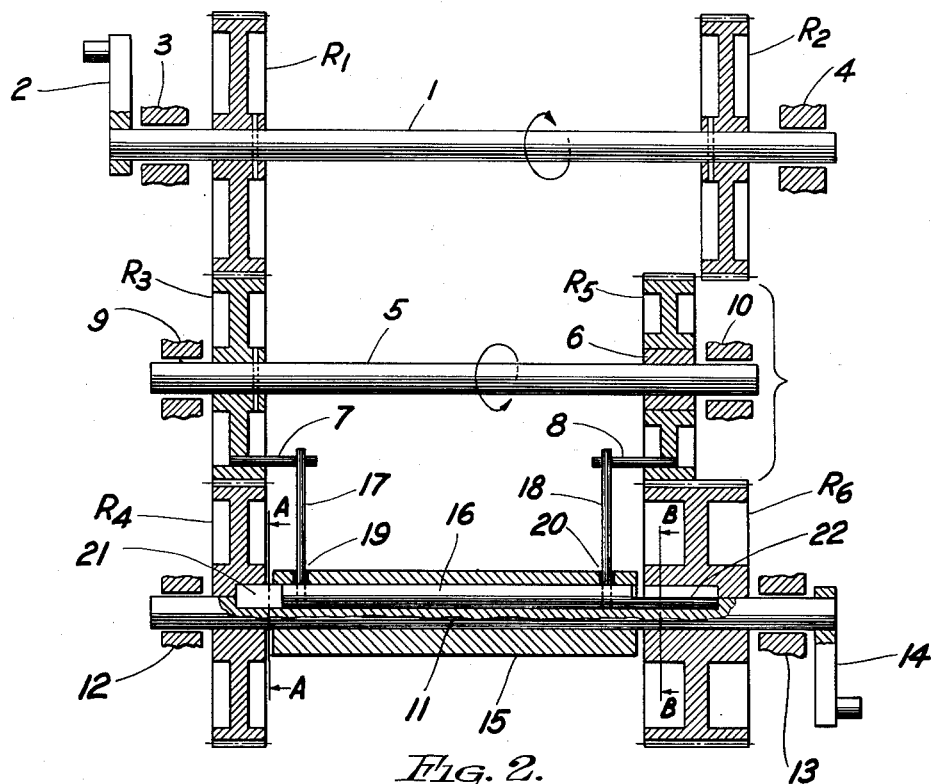

Fig. 2 representing diagrammatically in cross-section the same reversing mechanism.

Figure 3:
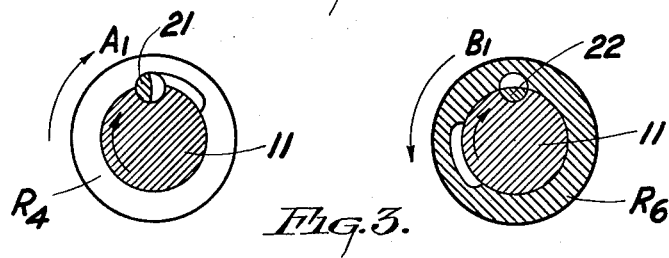

Fig. 3, A₁ and B₁, shows the position of the tipping keys with a given direction of rotation of the driven shaft at A and B, and viewed in the direction of the arrows in Fig. 2.

Figure 4:
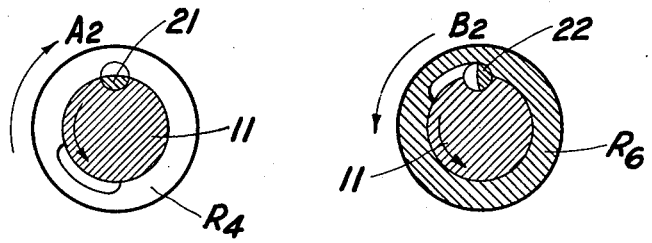

Fig. 4, A₂ and B₂, corresponds to Fig. 3 but holds for the other direction of rotation of the driven shaft.

Shaft 1 is driven by means of a crank 2 with pin and comprises two gear wheels $R_1$ and $R_2$ rigidly secured to it, these gear wheels being of the same size and having the same number of teeth. The shaft is supported in two bearings 3 and 4. An auxiliary shaft 5 carries a gear wheel $R_3$ rigidly secured to the shaft. Fitted on said shaft is a bushing 6 about which a gear wheel $R_5$ is freely rotatable. The gear wheels $R_3$ and $R_5$ each carry pins 7 and 8, the center line of which extends parallel to the center line of the shaft, so that these pins extend at right angles to the bodies of the gear wheels $R_3$ and $R_5$. The shaft 5 is supported in two bearings 9 and 10. A driven shaft 11 is supported by two bearings 12 and 13. This shaft carries two gear wheels $R_4$ and $R_6$ freely rotatable about the shaft. Furthermore, this shaft comprises a crank 14 with pin. Gear wheel $R_1$ is invariably meshed with gear wheel $R_3$, the latter also being invariably meshed with gear wheel $R_4$, but $R_1$ is never meshed with $R_4$. At the other end, gear wheel $R_2$ is invariably meshed with gear wheel $R_6$ and the latter is invariably meshed with gear wheel $R_5$ which, however, is never meshed with $R_2$. A bushing 15 is provided on shaft 11 between the gear wheels $R_4$ and $R_6$. Rotation of this bushing about shaft 11 is prevented by a round bar 16 lying in a recess in shaft 11 and in a recess in bushing 15. The bar 16 is provided with two levers 17 and 18 passing through slots 19 and 20 in bushing 15. The levers 17 and 18 are rigidly secured to bar 16. At each end the bar 16 terminates in a semi-circular tipping key 21 and 22 (respectively) which are at an angle of 90° with respect to each other in a manner such that if the tipping key 21 is completely in shaft 11, the tipping key 22 is only half in this shaft, and conversely. The hubs of gear wheels $R_4$ and $R_6$ are internally provided with recesses 23 and 24 of such a size as to correspond in a radial direction to one-half diameter of bar 16 but in a direction parallel to the circumference of shaft 11 are several times larger than the diameter of this bar.

The operation of this device is as follows, it being assumed that gears $R_3$ and $R_5$ have a diameter slightly smaller than those of gears $R_1$, $R_2$, $R_4$ and $R_6$. Furthermore it is taken that the shaft 1, viewed from the bearing 4, rotates in a clock-wise direction and the tipping keys are in the position shown in Fig. 3, also viewed from the bearing 4 end. If the shaft 1 comprising gears $R_1$ and $R_2$ rotate in the direction as indicated, the auxiliary shaft 5 and gear $R_3$ will rotate in the opposite direction as well as gear $R_6$, since the latter is driven by gear $R_2$. The gear $R_4$ rotates in the same direction as the gear $R_1$ and since the tipping key is in the position indicated by $A_1$ in Fig. 3, this gear will carry along bar 16 and consequently bushing 15 and shaft 11. In this event, however, gear $R_6$ is not coupled to shaft 11 and rotates freely about the shaft (Fig. 3 $B_1$). At a given instant the lever 18 engages the pin 8, it being understood that lever 18 and pin 8 have the same direction of rotation. The pin 8 will operate the lever 18 until the tipping key 21 is completely within shaft 11 so that it no longer couples gear $R_4$ to shaft 11. At the same time, however, the tipping key 22 is actuated so that the positions of the two tipping keys is as shown in Fig. 4. In this manner the gear $R_6$ is coupled to shaft 11 and the direction of rotation of this shaft is reversed until pin 7 engages lever 17. With the last-mentioned direction of rotation, the shafts 5 and 11 and consequently pin 7 and lever 17 have the same direction of rotation, so that the lever 17 is rapidly shifted and again carries along the tipping keys. Gear $R_6$ is again disengaged and gear $R_4$ is coupled to shaft 11, the initial position then being reached. Since the gears $R_3$ and $R_5$ are slightly smaller than the other gears the reversal of the direction of rotation of shaft 11 takes place only after the latter has performed a given number of revolutions. This number is adjustable by substituting gears of different diameter for gears $R_3$ and $R_5$. To this end the bearing of shaft 5 should be adjustable with respect to shafts 1 and 11. When using gears $R_3$ and $R_5$ having the same diameter and teeth as gears $R_1$, $R_2$, $R_4$ and $R_6$, the shaft 11 each time performs approximately one revolution, whereupon the direction of rotation is reversed. The represented device has the additional advantage of all gears meshing consistently with one another and of running consistently so that switching difficulties are avoided.

What we claim is:

1. A reversing device comprising a drive shaft having two gear wheels continually rotating in the same direction, a driven shaft being provided with two gear wheels freely rotatable thereabout and an auxiliary shaft having a pair of gear wheels, one of the gear wheels of said auxiliary shaft being meshed with one of the gear wheels of said drive shaft and with one of the gear wheels of said driven shaft, thereby delivering motive power from said drive shaft to said driven shaft, the other gear wheel of the driven shaft being driven directly by the other of the gear wheels of said drive shaft, and means including the other gear wheel on the auxiliary shaft for automatically, alternately and periodically coupling each of the two normally freely rotatable gear wheels of said driven shaft to said driven shaft whereby when said one of the two gear wheels of said driven shaft is coupled to said driven shaft, said other gear wheel is freely rotated about said driven shaft.

2. A reversing device as set forth in claim 1 wherein said means includes a recess in said driven shaft and a projection on each of the gear wheels of the auxiliary shaft, an element in said recess provided with two levers and having a tipping key at each end of said element for alternately coupling one of said tipping keys to the adjacent gear wheel of said chosen shaft, said projections alternately engaging the adjacent levers after a predetermined movement of said driven shaft thereby causing said drive shaft to propel said driven shaft through one of the two gear wheels of said driven shaft in opposite directions.

3. A reversing device comprising a drive shaft having two gear wheels continually rotating in the same direction, a driven shaft being provided with two spaced gear wheels freely rotatable thereabout and an auxiliary shaft having a pair of gear wheels, one of the gear wheels of said driven shaft being meshed with one of the gear wheels of said auxiliary shaft and said one of the gear wheels of said auxiliary shaft being meshed with one of the gear wheels of said drive shaft, the other gear wheel of the driven shaft being driven directly by the other of the gear wheels of said drive shaft, means including the other gear wheel on the auxiliary shaft for automatically, alternately and periodically coupling each of the two normally freely rotatable gear wheels of said driven shaft to said driven shaft whereby when said one of the two gear wheels of said driven shaft is coupled to said driven shaft, said other gear wheel is freely rotated about said driven shaft and means on the gear wheels of said auxiliary shaft for changing the direction of rotation of said shaft.

4. A reversing device comprising a drive shaft having two gear wheels continually rotating in the same direction, a grooved driven shaft being provided with two gear wheels and an auxiliary shaft having a pair of gear wheels, one of the gear wheels of said driven shaft being meshed with one of the gear wheels of said auxiliary shaft, said one of the gear wheels of said auxiliary shaft being meshed with one of the gear wheels of said drive shaft, the other gear wheel of the driven shaft being driven directly by the other of the gear wheels of said drive shaft, and means including the other gear wheel on the auxiliary shaft for automatically, alternately and periodically coupling each of the two normally freely rotatable gear wheels of said driven shaft to said driven shaft whereby when said one of the two gear wheels of said driven shaft is coupled to said driven shaft said other gear wheel is freely rotated about said driven shaft, said means comprising a bar in the groove of said driven shaft having a tipping key at each end thereof a pair of projections on said bar, and a projecting pin on each of the gear wheels of said auxiliary shaft adapted to co-act with one of said projections, the longitudinal axis of said pin extending parallel to the axis of rotation of either of the gear wheels of said auxiliary shaft.

5. A reversing device as set forth in claim 4 wherein the direction of rotation of each of said pins and its co-acting projection is the same.

6. A reversing device as set forth in claim 4 wherein the number of gear teeth on the gears of said auxiliary shaft is different from the number of gear teeth on the gears of the drive shaft and driven shaft, the number of gear teeth on the gears of the drive shaft and on the gears of the driven shaft being equal.

References Cited in the file of this patent

UNITED STATES PATENTS

| | | |
|---|---|---|
| 934,535 | Jensen | Sept. 21, 1909 |
| 1,224,961 | Sauer | May 8, 1917 |
| 1,394,607 | Campbell | Oct. 25, 1921 |
| 1,661,756 | Hunt et al. | Mar. 6, 1928 |
| 1,732,610 | Moscini | Oct. 22, 1929 |